US012485706B1

(12) United States Patent
Aelberts

(10) Patent No.: US 12,485,706 B1
(45) Date of Patent: Dec. 2, 2025

(54) PNEUMATIC TYRE WITH TREAD WEAR INDICATOR

(71) Applicant: APOLLO TYRES GLOBAL R&D B.V., Enschede (NL)

(72) Inventor: Antonius Theodore Folkert Aelberts, Enschede (NL)

(73) Assignee: APOLLO TYRES GLOBAL R&D B.V., Enschede (NL)

( * ) Notice: Subject to any disclaimer, the term of this patent is extended or adjusted under 35 U.S.C. 154(b) by 0 days.

(21) Appl. No.: 18/829,161

(22) Filed: Sep. 9, 2024

(30) Foreign Application Priority Data

Sep. 4, 2024 (DE) .................. 20 2024 105 058.4

(51) Int. Cl.
*B60C 11/24* (2006.01)
*B60C 11/13* (2006.01)

(52) U.S. Cl.
CPC .......... *B60C 11/24* (2013.01); *B60C 11/1307* (2013.01); *B60C 11/1353* (2013.01);
(Continued)

(58) Field of Classification Search
CPC ... B60C 11/24; B60C 11/045; B60C 11/1307; B60C 11/0323; B60C 11/0361; B60C 11/1353; B60C 2011/133; B60C 2011/1338; B60C 2011/1361; B60C 2011/0381; B60C 2011/0365
See application file for complete search history.

(56) References Cited

U.S. PATENT DOCUMENTS

| 2002/0036039 A1 | 3/2002 | Shimura |
| 2005/0081971 A1 | 4/2005 | Heinen |

(Continued)

FOREIGN PATENT DOCUMENTS

| DE | 102008024075 A1 | 11/2009 |
| DE | 102009003592 A1 | 9/2010 |

(Continued)

*Primary Examiner* — Blaine Copenheaver
*Assistant Examiner* — Wendy L Boss
(74) *Attorney, Agent, or Firm* — Renner, Otto, Boisselle & Sklar, LLP

(57) ABSTRACT

It is provided a pneumatic tyre, comprising: a tread having a circumferential direction, an axial direction, and a radial direction, the tread having a tread surface to come into contact with the ground and at least one circumferential groove which extends continuously in the circumferential direction, the at least one circumferential groove having a groove base, and at least one groove sidewall connected to the groove base; and at least one tread wear indicator in the circumferential groove that protrudes from the groove base and is connected to the at least one groove sidewall; wherein the groove sidewall has a cavity formed therein having a cavity base parallel to the groove base and cavity sidewalls extending in the radial direction to the tread surface, the cavity being open to the circumferential groove and the tread surface, wherein at least a portion of the cavity is positioned in a portion of the groove sidewall extending in the circumferential direction along the tread wear indicator, and wherein the tread wear indicator protruding from the groove base forms a step, where the height of the tread wear indicator in radial direction corresponds to the height of the cavity base.

10 Claims, 5 Drawing Sheets

Figure 1A:
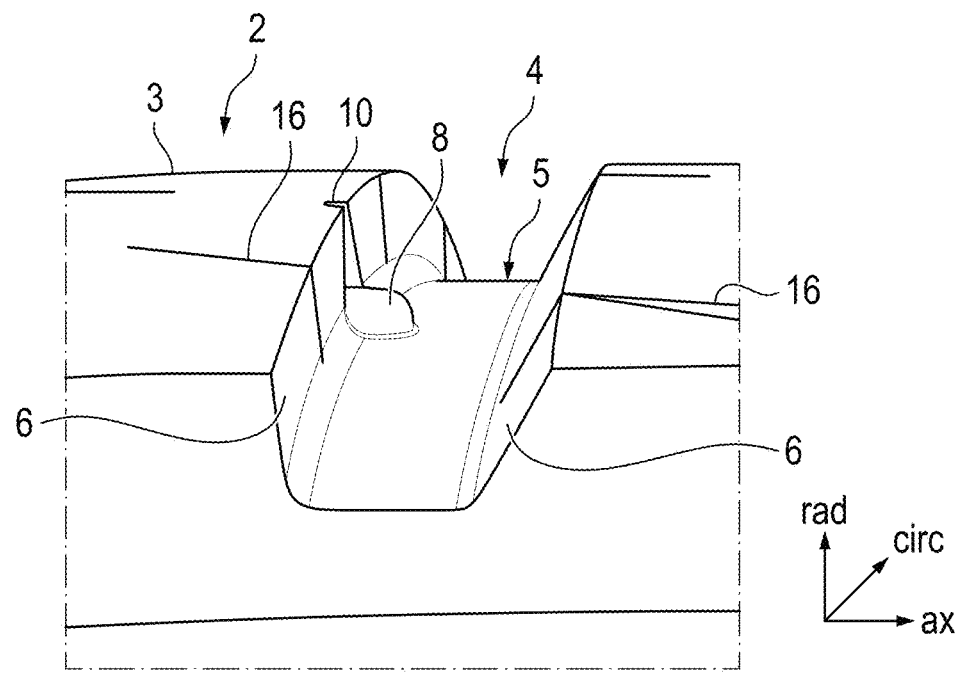

(52) U.S. Cl.
    CPC ............ *B60C 2011/1338* (2013.01); *B60C 2011/1361* (2013.01)

(56) References Cited

U.S. PATENT DOCUMENTS

| | | | |
|---|---|---|---|
| 2008/0093000 A1* | 4/2008 | Fujioka | B60C 11/12 152/209.21 |
| 2017/0246914 A1 | 8/2017 | Lundgren et al. | |
| 2019/0232726 A1* | 8/2019 | Lutz | B60C 11/045 |

FOREIGN PATENT DOCUMENTS

| | | |
|---|---|---|
| DE | 102015225941 A1 | 6/2017 |
| EP | 2113400 A1 | 11/2009 |
| EP | 3015291 A1 | 5/2016 |
| EP | 3616946 A1 | 3/2020 |

* cited by examiner

PNEUMATIC TYRE WITH TREAD WEAR INDICATOR

The invention relates to a pneumatic tyre having a tread comprising tread wear indicators.

Tread wear indicators are designed to assist a driver in determining the level of wear of a tyre tread. A use of tread wear indicators is mandated by law in many countries, where the international minimum standard for the radial surface of the tread wear indicator is a height of 1.6 mm from the base surface of the groove in which the tread wear indicator is positioned. When a tyres reaches the legal tread wear limit, commonly a tread depth of 1.6 mm, it has to be replaced to ensure safety on the roads. A general problem of tread wear indicators is providing visual means for determining the level of wear of the tyre tread. A variety of tread wear indicators having different forms are known.

DE 102008024075 A1 describes a pneumatic vehicle tyre having a tread with at least one wear indicator in at least one circumferential groove running around in the circumferential direction. The wear indicator is composed of indicator parts transversely to the extension of the circumferential groove, said indicator parts providing at least three indicator surfaces which are located at different distances from the groove base and have different sizes and/or shapes in plan view.

DE 102009003592 A1 describes a tread profile of a pneumatic vehicle tyre wherein a plurality of elevations is formed in the groove base distributed along the main extent of the groove, wherein the elevations consist of at least two elevation portions arranged next to one another in the direction transverse to the main extent of the groove.

EP 2113400 A1 describes a pneumatic tyre with a wear indicator that is arranged in a main groove, i.e. peripheral groove, such that the wear indicator exhibits an axial width corresponding to the half width of the main groove. A convex structure is arranged on a surface of the indicator, such that a reminding profile depth is reached, after the wear of the convex structure.

EP 3015291 A1 describes a pneumatic tyre having a tread with at least one abrasion indicator which is positioned in a circumferential groove. The abrasion indicator has three indicator parts which have indicator surfaces which are located at different heights determined in the radial direction from the groove base and run essentially parallel to the tread surface.

EP 3616946 A1 describes a pneumatic tyre having a tread with grooves wherein an elevation forming an abrasion indicator is provided in at least one groove on the groove base. The elevation has an indicator part which is upright in plan view and in the direction of extent of the groove is H-shaped, has lateral limbs and has a connecting limb connecting said lateral limbs.

US 2002/0036039 A1 describes a measuring method of a tread wear amount by using a pneumatic tyre in which a mark portion is formed on a part of a tread surface, the mark portion changing its surface shape as wear progresses.

US 2005/0081971 A1 describes a tyre tread having one or more caverns formed in the sidewall of the traction elements. The cavern has a base with information therein to indicate the state of wear of the tyre and a ceiling that is progressively worn away as the tread wears.

Further, elevations having other purposes can be provided in a tread groove, such as elevations on the groove base which are spaced apart from one another in the circumferential direction and act as sound breakers as described in DE 102015225941 A1. The elevations each have a cylindrical base part which is positioned at least substantially centrally on the groove base and from which four stabilizing webs run radially along the groove base. US 2017/0246914 A1 describes tyre traction elements oriented in a circumferential groove to provide improved snow and/or mud traction. The traction elements are connected to the at least one groove sidewall and the groove base, and the traction elements have a plurality of indentations.

A tread wear indicator (TWI) should not interfere with the water drainage in the groove, such as by its size blocking the water flow, while on the other hand, depending on the size and form of the tread wear indicator it can be difficult to determine the level of wear. In general, tread wear indicators in a circumferential groove perform well in view of visibility, but blocking the water flow in the main groove impairs the drainage. There is a permanent need for providing tyre treads with tread wear indicators located in the circumferential groove improving the water drainage.

It is an object of the invention to provide tyre treads with tread wear indicators located in the circumferential groove improving the water drainage and worn state aquaplaning risk while maintaining good visibility.

The object is accomplished by a pneumatic tyre comprising a tread having a tread wear indicator according to claim 1. The object further is accomplished by a wheel for an automobile comprising such a tread connected to the tyre rim according to claim 9. Preferred embodiments of the invention are given by the dependent claims, which can constitute each solely or in combination an aspect of the invention.

Accordingly, a pneumatic tyre is provided, comprising:
a tread having a circumferential direction, an axial direction, and a radial direction, the tread having a tread surface to come into contact with the ground and at least one circumferential groove which extends continuously in the circumferential direction, the at least one circumferential groove having a groove base, and at least one groove sidewall connected to the groove base; and
at least one tread wear indicator in the circumferential groove that protrudes from the groove base and is connected to the at least one groove sidewall;
wherein the groove sidewall has a cavity formed therein having a cavity base parallel to the groove base and cavity sidewalls extending in the radial direction to the tread surface, the cavity being open to the circumferential groove and the tread surface, wherein at least a portion of the cavity is positioned in a portion of the groove sidewall extending in the circumferential direction along the tread wear indicator, and wherein the tread wear indicator protruding from the groove base forms a step, where the height of the tread wear indicator in radial direction corresponds to the height of the cavity base.

The cavity positioned in the groove sidewall extending along the tread wear indicator provides an additional void for water drainage. The tread wear indicator with adjacent cavity according to the invention advantageously provides for improved aquaplaning performance. Particularly, simulation results showed a significant improvement in contact area of a worn tyre and in water flow through the circumferential groove.

Further, the wearing down of the cavity sidewalls increases the area of the cavity base visible when inspecting the tread wear indicator. Thus, the tread wear indicator provides good visibility of progressing wear. The area of the tread that forms the cavity base provides the visual effect to the inspecting viewer or driver appearing to extend the visible surface of the tread wear indicator. Particularly, a significant switch in the visible appearance is provided at the minimum wear level. At this time point, the cavity sidewalls vanish and the cavity base is no longer distinguishable from the tread surface as the tread wear indicator surface blends into the tread surface.

As used herein, the term "tread" refers to a moulded rubber component which, when bonded to a tyre casing, includes that portion of the tyre that comes into contact with the road when the tyre is normally inflated and under normal load.

As used herein, the term "groove" refers to an elongated void area in a tread that may extend circumferentially about the tread in a straight manner. The "groove width" is equal to tread surface area occupied by a groove. The depth of a groove may be constant around the circumference of the tread.

As used herein, the term "axial" and "axially" refers to directions that are parallel to the axis of rotation of the tyre. As used herein, the term "radial" and "radially" refers to directions radially toward or away from the axis of rotation of the tyre. As used herein, the term "circumferential" refers to directions extending along the perimeter of the surface of the annular tread perpendicular to the axial direction. Herein, the terms "circumferential" and "longitudinal" are used synonymously. As used herein, the term "lateral" refers to an axial direction.

As used herein, the term "inner" refers to the radial direction "inwards" or towards the inside of the tyre.

The tread wear indicator protrudes from the groove base and the cavity or at least a portion of the cavity is positioned in the portion of the groove sidewall extending in the circumferential direction along the tread wear indicator, where the height of the tread wear indicator in radial direction corresponds to the height of the cavity base. In other words: the raised portion of the groove base forming the tread wear indicator extends into the cavity forming the base of the cavity or, looking at it the other way round, the base of the cavity extends into the circumferential groove so as to form the protrusion or step forming the tread wear indicator.

With progressing wear the abrasion of the cavity walls allows an increasing view on its base surface and the apparent shape of the tread wear indicator increases. When the remaining depth of the tread approaches the level of the tread wear indicator, a maximal extension of the base surface of the cavity and thus of the apparent extension of the tread wear indicator or step is visible while the remaining tread appears as a relief structure. When the tread is worn down to the tread wear indicator level, its apparent shape abruptly changes and is reduced to the protrusion in the groove.

In embodiments, the cavity has an opening in the tread surface that is formed so as to increase in the radial direction towards the cavity base as the depth of the tread decreases due to wear. While the total volume of the cavity decreases due to wear, the perimeter of the opening in the axial and circumferential directions increases. Thus, the opening of the cavity widens with wear. The increasing opening provides for easier water drainage while the volume of the circumferential groove decreases with wear. Thus, aquaplaning performance particularly is improved for a worn tyre.

In embodiments, the cavity opening in the tread surface gradually or continuously increases in the radial direction towards the cavity base as the depth of the tread decreases due to wear. Alternatively, the cavity opening in the tread surface may increase stepwise in the radial direction towards the cavity base.

The cavity opening in the unused tread may have a semi-circle form, a rectangular form with rounded corners or the form of a polygonal arc having three connected straight edges with rounded corners. The shape of the cavity and the cavity opening in the radial direction may vary. In embodiments, the opening of the cavity with decreasing depth of the tread assumes a trapezoidal or elongated trapezoidal form with rounded corners. Such a form of the opening in the circumferential direction advantageously reduces water resistance and the water drainage can be improved.

In embodiments, the tread wear indicator protruding from the groove base forms a step having a form of an elongated trapezoidal prism with rounded corners. Such a form of the tread wear indicator is aerodynamical in the circumferential direction, and advantageously can reduce water resistance.

In preferred embodiments, the tread wear indicator has a form of an elongated trapezoidal prism with rounded corners and the cavity with wear also assumes the form of a trapezoidal or elongated trapezoidal prism with rounded corners. Advantageously, such a combination results in an improved visible symmetry of the tread wear indicator. Symmetry is also advantageous for the manufacture of the tyre, as the demoulding is easier. Further, such a symmetry is advantageous for a non-directional tyre as differences of the running direction and reverse direction are reduced.

In embodiments, the width of the tread wear indicator in axial direction is less than 50%, preferably less than 40% or 30% of the axial width of the circumferential groove. An axial width of the tread wear indicator below 50%, 40%, or 30% of the axial width of the circumferential groove provides less turbulences and thus less disturbance of water drainage.

In embodiments, the height of the tread wear indicator in the radial direction is 1.6 mm. 1.6 mm is the common minimum legal tread wear limit, where the tyre has to be replaced to ensure safety on the roads, as well as remaining law compliant.

The volume of the tread wear indicator protruding into the groove may be essentially the same as the volume of a prior art tread wear indicator. Thus, in a worn tyre, while the visible radially outer surface of the tread wear indicator will be the same as of a usual tread wear indicator, the tread wear indicator will not impede water drainage.

In embodiments, the ratio of the axial width of the cavity base to the axial width of the tread wear indicator may be in a range of from 0.8 to 1.2. In embodiments, the width of the cavity base in axial direction is smaller than the width of the tread wear indicator. Preferably, the width of the cavity base in axial direction is equal to the width of the tread wear indicator. Such relation of the width of the cavity base and the tread wear indicator provides for balance between improved visibility of the tread wear indicator and good water drainage. In embodiments, the length of the cavity base in circumferential direction is less than or equal to the length of the tread wear indicator.

At least a portion of the cavity is positioned in the portion of the groove sidewall extending in the circumferential direction along the tread wear indicator. An overlap of the cavity and the tread wear indicator provides for the visual and water drainage effects, while a certain offset is allowable. In embodiments, a circumferential offset of at most 50% is provided between a section of maximum cavity width in the tyre axial direction and a middle section of maximum tread wear indicator width in the axial direction.

In embodiments, the cavity is positioned in the portion of the groove sidewall extending in the circumferential direction along the tread wear indicator.

In embodiments, a plurality of tread wear indicators and cavities according to the invention is positioned in the at least one circumferential groove. In embodiments, at least one or a plurality of tread wear indicators and cavities according to the invention are positioned in one, two or more circumferential grooves. In embodiments, six or more tread wear indicators and cavities according to the invention are positioned in a circumferential groove, which tread wear indicators in the circumferential direction are equally spaced apart. While a number of six tread wear indicators equally spaced apart in the circumferential direction in some jurisdictions are legal requirement, the tread wear indicators are not necessarily required to be identical. Thus, in some embodiments, one or more tread wear indicators and cavities according to the invention may be combined with other tread wear indicators. In preferred embodiments, one or a plurality of tread wear indicators and cavities according to the invention are positioned in top and middle circumferential grooves.

In embodiments of a new tyre, the cross-sectional area of the tread wear indicator may be in a range of 3% to 10%, preferably may correspond to 6%, 5% or 4%, of the cross-sectional area of the circumferential (longitudinal) groove. The maximum cross section area of the cavity may be in a range of 5% to 20%, preferably in a range of 6% to 14%, of the cross section of the circumferential (longitudinal) groove. In embodiments, in a cross section of a tyre worn to the 1.6 mm wear limit the tread wear indicator cross sectional area may be in a range of 16% to 32%, preferably may correspond to 16%, 17%, 21%, 22%, 27%, 30%, 31% or 32%, of the groove cross sectional area.

In embodiments, a new front tyre for a vehicle may be provided with the tread wear indicator according to the invention wherein the cross-sectional area of the tread wear indicator is in the range of from 3% to 6% of the cross-sectional area of the longitudinal groove. In embodiments, the cross-sectional area of the tread wear indicator for the worn front tyre may be in the range of 16% to 27% of the cross-sectional area of the longitudinal groove. In embodiments, the cross-sectional area of the tread wear indicator for a new rear tyre may be in the range of 4% to 7% of the cross-sectional area of the longitudinal groove. In embodiments, the cross-sectional area of the tread wear indicator for a worn rear tyre may be in the range of 20% to 32% of the cross-sectional area of the longitudinal groove.

According to a further aspect is provided a wheel for an automobile comprising a tyre rim for being connected to an axle of the automobile and a pneumatic tyre according to the invention connected to the tyre rim. For the description of the pneumatic tyre and the tread wear indicator, reference is made to the description provided above.

Figure 1B:
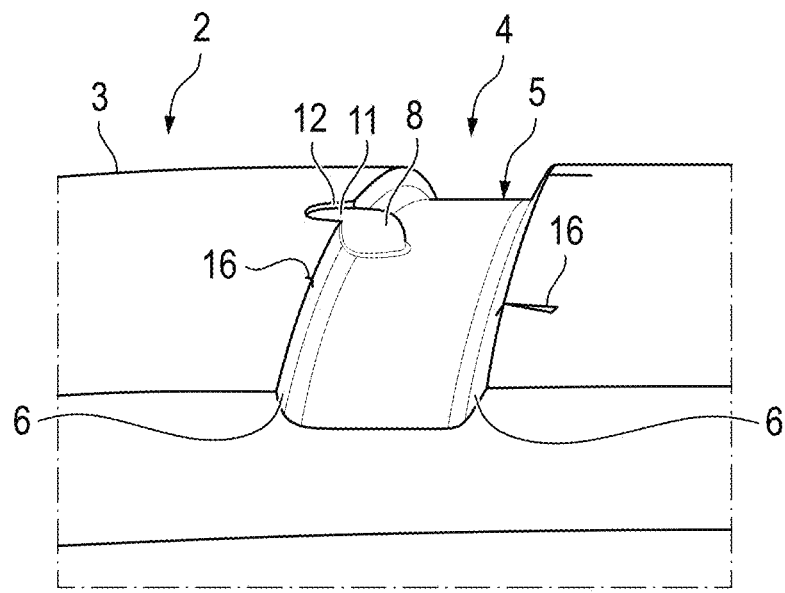

In the following the invention is explained in detail by example with reference to the enclosed drawings showing preferred embodiments of the present invention, wherein each feature can constitute solely or in combination an aspect of the invention. In the drawings:

FIG. 1: is a schematic perspective view of a pneumatic tyre comprising a tread having tread wear indicator and cavity according to an embodiment of the invention. FIG. 1A illustrates a new tyre and FIG. 1B illustrates a worn tyre.

Figure 2A:
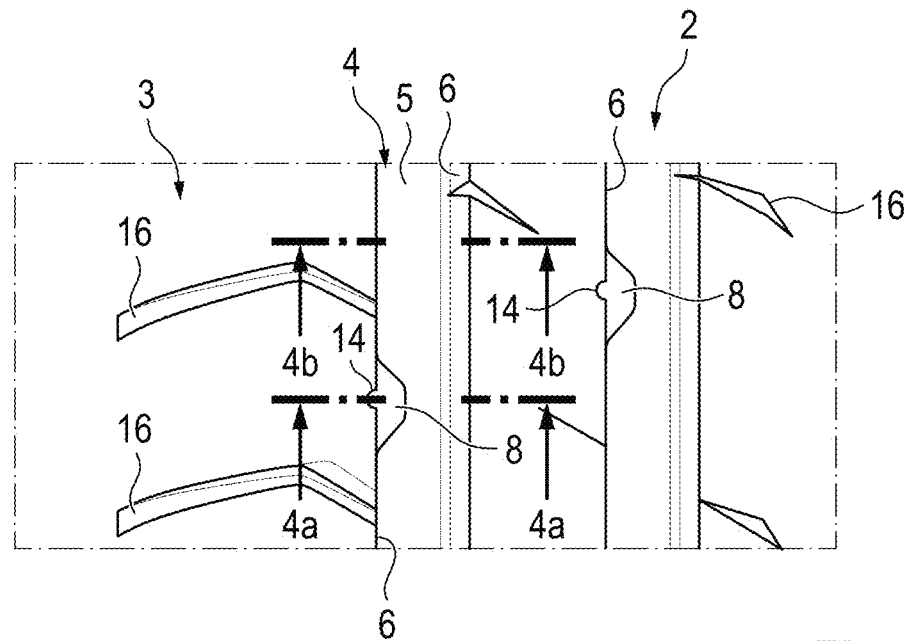
Figure 2B:
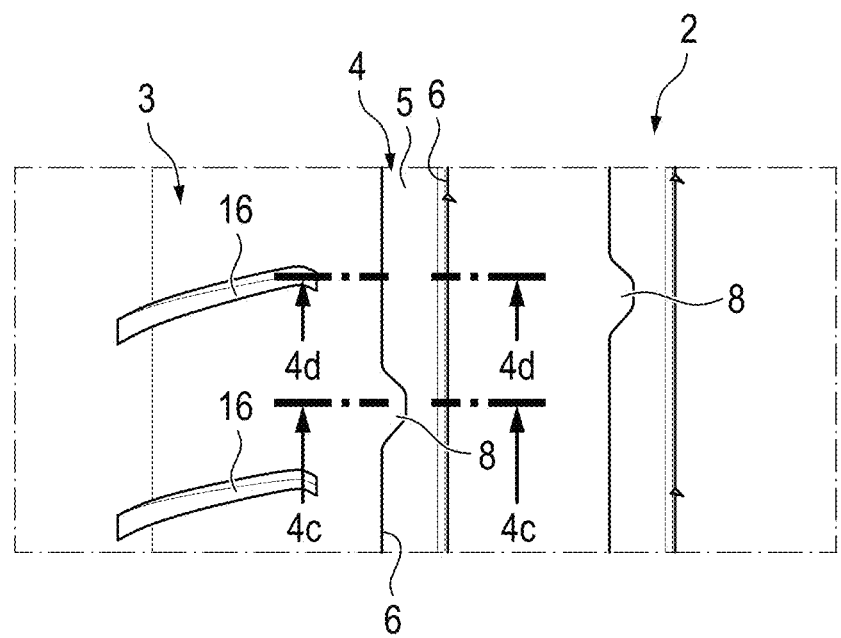

FIG. 2: is a schematic top view on a tread having tread wear indicator and cavity according to an embodiment of the invention. FIG. 2A illustrates a new tyre and FIG. 2B illustrates a worn tyre.

FIG. 3: is a schematic perspective view of a pneumatic tyre comprising a tread having tread wear indicator and cavity according to an embodiment of the invention. FIGS. 3A to 3E illustrate progressing wear, where FIG. 3A shows a new tyre and FIGS. 3B, 3C, 3D and 3E illustrate the tyre worn down to 6.0 mm, 4.0 mm, 2.0 mm and 1.5 mm, respectively.

FIG. 4: is a cross-sectional view of the tread wear indicator and cavity according to the embodiment shown in FIGS. 2A-2B. FIG. 4A illustrates a new tyre section across the tread wear indicator and cavity. FIG. 4B illustrates a new tyre section across a portion of the groove having no wear indicator. FIG. 4C illustrates a worn tyre section across the tread wear indicator. FIG. 4D illustrates a worn tyre section across a portion of the groove having no wear indicator.

The pneumatic tyre as illustrated in FIG. 1 comprises a tread 2 having a circumferential direction, an axial direction, and a radial direction. The tread 2 has a tread surface 3 to come into contact with the ground and a circumferential groove 4 is shown which extends continuously in the circumferential direction. The circumferential groove 4 has a groove base 5, and groove sidewalls 6 connected to the groove base 5. In the circumferential groove 4 a tread wear indicator 8 protrudes from the groove base 5 and is connected to one groove sidewall 6. The tread wear indicator 8 protruding from the groove base 5 forms a step. The width of the tread wear indicator 8 in axial direction is less than 40% of the axial width of the circumferential groove 4.

FIG. 1A illustrates a new tyre. The groove sidewall 6 has a cavity 10 formed therein that is open to the circumferential groove 4 and the tread surface 3. The cavity 10 is positioned in a portion of the groove sidewall 6 that extends in the circumferential direction along the tread wear indicator 8. FIG. 1B illustrates a worn tyre that is worn down almost to the level of the tread wear indicator 8. Due to wear the cavity vanished and only a minor height of the cavity sidewalls 12 extending in the radial direction to the tread surface 3 is left, while the cavity base 11 that is parallel to the groove base 5 is fully visible. FIG. 1B shows that the height of the tread wear indicator 8 in the radial direction corresponds to the height of the cavity base 11 or, in other words, the raised portion of the groove base forming the tread wear indicator 8 extends into the cavity 10 forming the base 11 of the cavity or, looking at it the other way, the base 11 of the cavity extends into the circumferential groove 3 so as to form the step forming the tread wear indicator 8. Due to wear also the further grooves 16 extending in axial direction in the tread are reduced in their dimensions.

FIG. 2 provides schematic top views on a tread having tread wear indicators and cavities shown for a new tyre in FIG. 2A and a worn tyre in FIG. 2B. The section of tread 2 as shown has two circumferential grooves 4. The circumferential grooves 4 have a groove base 5 and groove sidewalls 6 connected to the groove base 5. In each of the circumferential grooves 4 a tread wear indicator 8 forming a step protrudes from the groove base 5 and is connected to a groove sidewall 6. FIG. 2A illustrates a new tyre. The top views of a new tyre in FIG. 2A and worn in FIG. 2B illustrate the cavity opening 14 in the tread surface 3 that is formed so as to increase in the radial direction towards the cavity base 11 as the depth of the tread 2 decreases due to wear.

FIG. 2B illustrates the tyre that is worn down to the height of the tread wear indicators 8 or to below the original height, such to 1.6 mm and below. The remaining visible shape is reduced to the portion in the groove base 5 appearing as a projection of the sidewall 6 into the groove 4. The radially outer surface area of the tread wear indicator 8 in the circumferential groove 4 is substantially the same compared to a prior art tread wear indicator, such as in the form of a bar spanning from sidewall to sidewall over the whole width of the groove. Still, the tread wear indicator 8 does not impede water drainage from the groove.

Figure 3A:
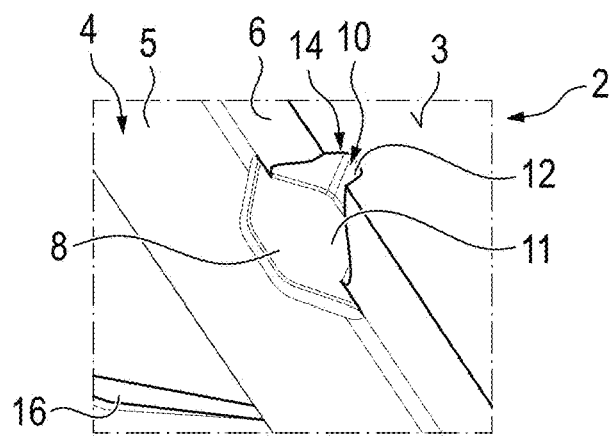

FIGS. 3A to 3E illustrate how the visible shape of the tread wear indicator 8 gradually changes as wear progresses. FIG. 3A shows a new tyre and FIGS. 3B, 3C, 3D and 3E illustrate the tyre worn down to 6.0 mm, 4.0 mm, 2.0 mm and 1.5 mm, respectively, where the height of the tread wear indicator 8 in the radial direction is 1.6 mm.

Figure 3B:
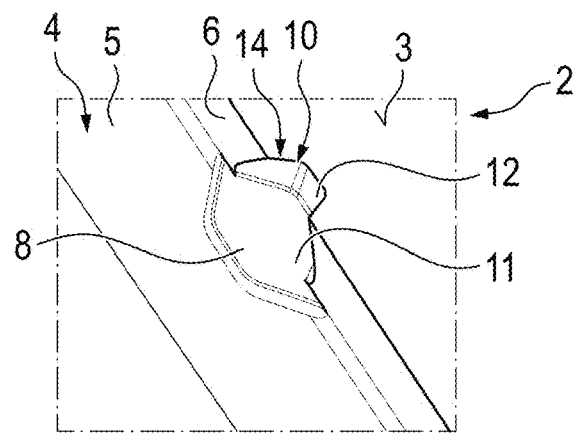
Figure 3C:
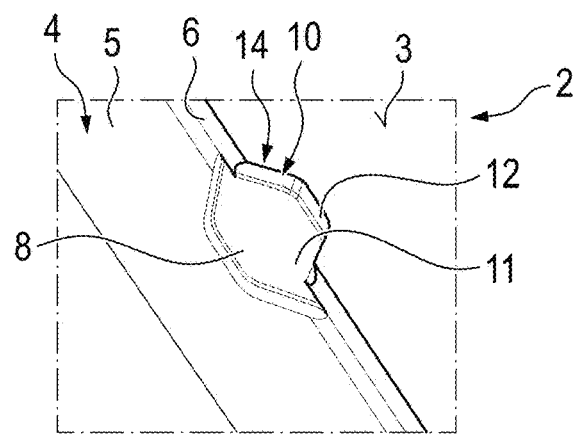
Figure 3D:
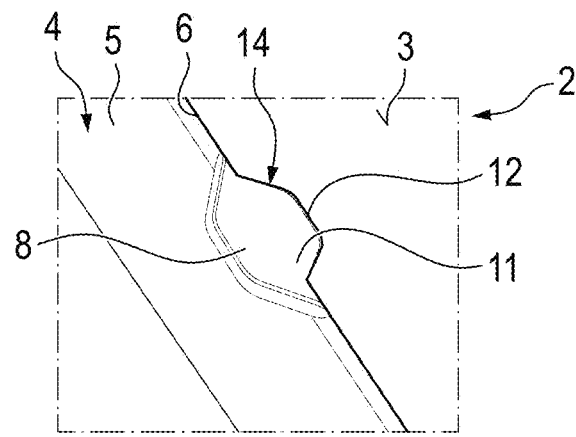
Figure 3E:
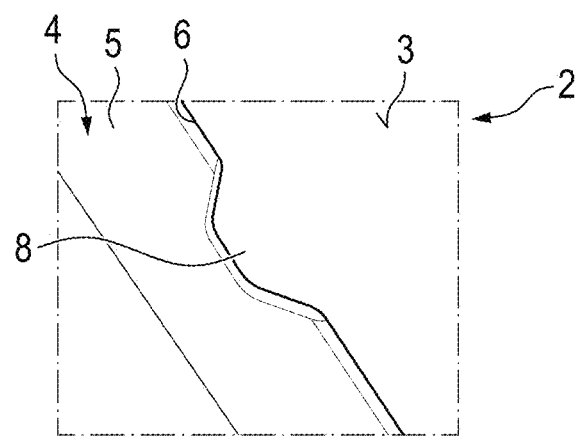
Figure 4A:
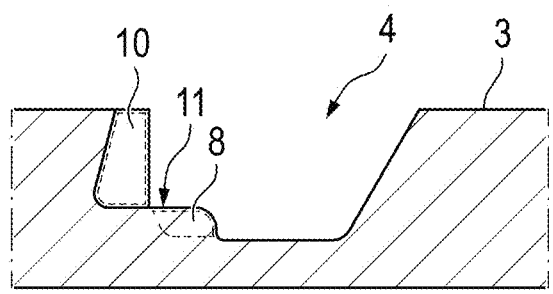
Figure 4B:
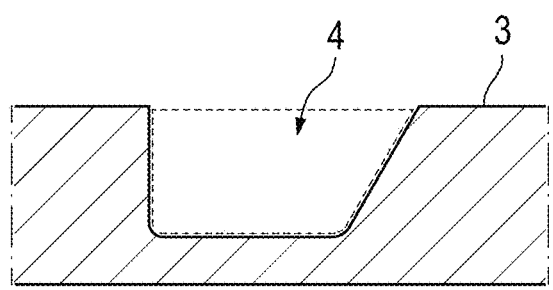
Figure 4C:
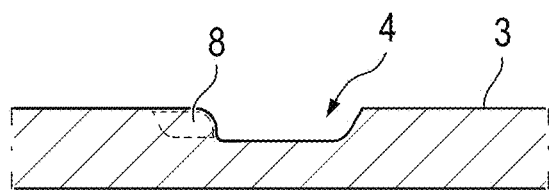
Figure 4D:
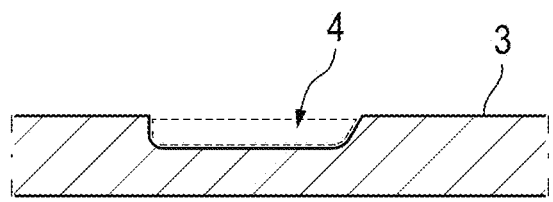

FIG. 3A shows a section of a new tyre with a tread 2 with a circumferential groove 4 with groove base 5 and groove sidewalls 6 connected to the groove base 5. In the circumferential groove 4 a tread wear indicator 8 in the form of a step protrudes from the groove base 5 and is connected to a groove sidewall 6. In the unworn state of the tread 2 as of FIG. 3A, the opening 14 of the cavity 10 is a polygonal arc having three connected straight edges with rounded corners. The tread wear indicator 8 forms a step having a form of an elongated trapezoidal prism with rounded corners. The cavity 10 is positioned in the portion of the groove sidewall 6 extending in the circumferential direction along the tread wear indicator 8. This overlap of cavity 10 and tread wear indicator 8 provides for the visual effects due to wear as depicted in FIGS. 3B, 3C, 3D and 3E. The cavity 10 has an opening 14 in the tread surface 3 that is formed so as to increase in the radial direction towards the cavity base 11 as the depth of the tread 2 decreases due to wear. FIGS. 3B, 3C, and 3D show how the wearing down of the tread 2 gradually increases the area of the cavity base 11 that becomes visible when inspecting the tread wear indicator. With progressing wear, the opening 14 with decreasing depth of the tread 2 assumes a trapezoidal form with rounded corners. Thus, when the tread is worn down, both, cavity base 10 and the surface of the tread wear indicator 8, have an elongated trapezoidal form with rounded corners. When the remaining depth of the tread approaches the level of the tread wear indicator 8 as shown in FIG. 3D, a maximal extension of the cavity base 11 is visible while the remaining tread appears as a relief structure and thus the tread wear indicator 8 appears to have its maximum expansion. When the tread 2 is worn down to the tread wear indicator level as shown in FIG. 3E and the cavity sidewalls have vanished, the cavity base is no longer distinguishable from the tread surface and the tread wear indicator 8 blends into the tread surface 3. At this height, the apparent shape of the tread wear indicator 8 abruptly changes.

FIG. 4 is a cross-sectional view of the tread 3, the tread wear indicator 8 and cavity 10 according to the embodiment shown in FIGS. 2A and 2B. FIG. 4A illustrates section across the tread wear indicator 8 and cavity 10 of a new tyre. The width of the cavity base 11 in axial direction is less than the width of the tread wear indicator 8. FIG. 4B illustrates a new tyre section across a portion of the groove 4 having no tread wear indicator 8. The cross-sectional area of the tread wear indicator 8 shown in FIG. 4A corresponds to 6% of the cross-sectional area of the longitudinal groove shown in FIG. 4B. The maximum cross section area of the cavity shown in FIG. 4A corresponds to 14% of the cross section of the longitudinal groove 4 shown in FIG. 4B. FIG. 4C illustrates a section across the tread wear indicator 8 of a worn tyre. FIG. 4D illustrates a worn tyre section across a portion of the groove 4 having no tread wear indicator 8. For the tyre worn to the 1.6 mm wear limit, the cross-sectional area of the tread wear indicator 8 shown in FIG. 4C corresponds to 29% of the cross-sectional area of the longitudinal groove 4 shown in FIG. 4B.

Examples of the present invention will be described below.

Example 1: Examples of Tyres

Specific examples of width and height and cross-sectional areas of the circumferential (longitudinal) groove and tread wear indicator (TWI) of front and rear tyres are summarised in the following Tables 1A and 1B:

TABLE 1A dimensions of groove and TWI

| Example | Tyre type | Width groove [mm] | Height groove [mm] | Height TWI [mm] | Width TWI [mm] | Area groove ($A_{groove}$) | Area TWI ($A_{TWI}$) | Ratio $A_{TWI}/A_{groove}$ |
|---|---|---|---|---|---|---|---|---|
| A | Rear tyre | 11 | 7.8 | 1.6 | 3.5 | 85.8 | 5.6 | 6.5% |
| B | Rear tyre | 11.35 | 7.8 | 1.6 | 3.5 | 88.53 | 5.6 | 6.3% |
| C | Rear tyre | 16.25 | 7.8 | 1.6 | 3.5 | 126.75 | 5.6 | 4.4% |
| D | Rear tyre | 16.8 | 7.8 | 1.6 | 3.5 | 131.04 | 5.6 | 4.3% |
| E | Front tyre | 21.05 | 8.2 | 1.6 | 3.5 | 172.61 | 5.6 | 3.2% |
| F | Front tyre | 20.8 | 8.2 | 1.6 | 3.5 | 170.56 | 5.6 | 3.3% |
| G | Front tyre | 13.15 | 8.2 | 1.6 | 3.5 | 107.83 | 5.6 | 5.2% |
| H | Front tyre | 13 | 8.2 | 1.6 | 3.5 | 106.6 | 5.6 | 5.3% |

TABLE 1B dimensions of cavity and groove

| Example | Height cavity [mm] | Area cavity ($A_{cavity}$) | Ratio $A_{cavity}/A_{groove}$ |
|---|---|---|---|
| A | 6.2 | 10.85 | 12.6% |
| B | 6.2 | 10.85 | 12.3% |
| C | 6.2 | 10.85 | 8.6% |
| D | 6.2 | 10.85 | 8.3% |
| E | 6.6 | 11.55 | 6.7% |
| F | 6.6 | 11.55 | 6.8% |
| G | 6.6 | 11.55 | 10.7% |
| H | 6.6 | 11.55 | 10.8% |

Example 2: Simulation Experiments

In this example, simulation prototype measurements were carried out to determine the advantages of the invention in terms of contact area and water drainage. Simulations were performed for tyres of the size 255/35 R20 having four circumferential (longitudinal) grooves 1, 2, 3, 4 having axial width W1, W2, W3, W4 wherein W1, W2>W3>W4.

The tyre behaviour was simulated with a nominal load of 515 kg, 250 kPa inflation pressure and the vehicle speed was set to 60 km per hour. The contact patch in the wet condition was simulated as the tread wear indicator enters the contact area. In a first instance, the tyres having a worn groove depth of 3.2 mm entered a water depth of 4 mm. In a second instance, the tyres having a worn groove depth of 1.6 mm (end of life) entered a water depth of 2 mm.

In one tyre, the grooves 1 and 2 each comprised six tread wear indicators according to the invention equally spaced along the circumference. The groove 3 contained six prior art tread wear indicators equally spaced along the circumference, which had the form of a bar with a height of 1.6 mm spanning from sidewall to sidewall over the whole width W1, W2 of the groove. The groove 4 was devoid of a tread wear indicator.

In a control tyre, the grooves 1', 2', 3' each comprised six prior art tread wear indicators equally spaced along the circumference, which had the form of a bar with a height of 1.6 mm spanning from sidewall to sidewall over the whole width W1', W2', W3' of the groove. The groove 4' was devoid of a tread wear indicator.

TABLE 2

Results for tread wear indicators (TWIs)

| Groove depth [mm] for the worn tyre | Prior art TWI enters contact average contact area [%] | New TWI enters contact average contact area [%] |
|---|---|---|
| 3.2 | 100 | 115 |
| 1.6 | 100 | 126 |

The results show that the tread wear indicator according to the invention provided for an increase of from 15% to 26% of the average contact area when the tread wear indicator enters the contact patch.

The simulation results further showed that at a groove depth of 1.6 mm water still flowed in form of a continuous flow through the grooves 1 and 2 containing the tread wear indicators of the invention, while water flow was reduced to single droplets in groove 3, as in grooves 1', 2', 3' of the control tyre.

These results in summary show that the tread wear indicators of the invention provide improved water drainage and contact in the wet condition improving worn-state aquaplaning risk as well as improved visibility.

REFERENCE SIGNS

1 tyre
2 tread
3 tread surface
4 circumferential groove
5 groove base
6 groove sidewall
8 tread wear indicator
10 cavity
11 cavity base
12 cavity sidewall
14 cavity opening
16 axial groove

The invention claimed is:

1. A pneumatic tyre, comprising:
a tread having a circumferential direction, an axial direction, and a radial direction,
the tread having a tread surface to come into contact with a ground and at least one circumferential groove which extends continuously in the circumferential direction, the at least one circumferential groove having a groove base, and at least one groove sidewall connected to the groove base; and
at least one tread wear indicator in the circumferential groove that protrudes from the groove base and is connected to the at least one groove sidewall;
wherein the groove sidewall has a cavity formed therein having a cavity base parallel to the groove base and cavity sidewalls extending in the radial direction to the tread surface, the cavity being open to the circumferential groove and the tread surface, wherein at least a portion of the cavity is positioned in a portion of the groove sidewall extending in the circumferential direction along the tread wear indicator,
wherein the tread wear indicator protruding from the groove base forms a step, where the height of the tread wear indicator in radial direction corresponds to the height of the cavity base, and
wherein the cavity has an opening in the tread surface that is formed so as to increase in the radial direction towards the cavity base as the depth of the tread decreases due to wear.

2. The tyre according to claim 1, wherein the opening assumes a trapezoidal form with rounded corners.

3. The tyre according to claim 1, wherein the tread wear indicator protruding from the groove base forms a step having a form of an elongated trapezoidal prism with rounded corners.

4. The tyre according to claim 1, wherein the width of the tread wear indicator in axial direction is less than 50% of the axial width of the circumferential groove.

5. The tyre according to claim 1, wherein the width of the cavity base in axial direction is less than or equal to the width of the tread wear indicator.

6. The tyre according to claim 1, wherein the cavity is positioned in the portion of the groove sidewall extending in the circumferential direction along the tread wear indicator.

7. The tyre according to claim 1, wherein a plurality of tread wear indicators and cavities is positioned in the at least one circumferential groove or wherein at least one or a plurality of tread wear indicators and cavities are positioned in one, two or more circumferential grooves.

8. A wheel for an automobile comprising a tyre rim for being connected to an axle of the automobile and a tyre according to claim 1 connected to the tyre rim.

9. The tyre according to claim 1, wherein the width of the tread wear indicator in axial direction is less than 40% of the axial width of the circumferential groove.

10. The tyre according to claim 1, wherein the width of the tread wear indicator in axial direction is less than 30% of the axial width of the circumferential groove.

* * * * *